United States Patent
Hayakawa et al.

(10) Patent No.: US 6,693,757 B2
(45) Date of Patent: Feb. 17, 2004

(54) APPARATUS AND METHOD FOR ADJUSTING BALANCE AND ASSEMBLING DISK DRIVES

(75) Inventors: Tatsuo Hayakawa, Fujisawa (JP); Toshiki Hirano, San Jose, CA (US); Hitoshi Tamura, Chigasaki (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 308 days.

(21) Appl. No.: 09/846,754

(22) Filed: May 1, 2001

(65) Prior Publication Data

US 2001/0040751 A1 Nov. 15, 2001

(51) Int. Cl.$^7$ ............................................. G11B 19/02
(52) U.S. Cl. .......................................... 360/69; 360/75
(58) Field of Search ........................... 360/69, 31, 55, 360/71, 75; 369/53.14, 53.3

(56) References Cited

U.S. PATENT DOCUMENTS 5,555,144 A * 9/1996 Wood et al. ............. 360/98.08

\* cited by examiner

*Primary Examiner*—David Hudspeth
*Assistant Examiner*—Mitchell Slavitt
(74) *Attorney, Agent, or Firm*—Robert B. Martin; Bracewell & Patterson, L.L.P.

(57) ABSTRACT

An apparatus and method for adjusting balance in a disk drive, and a method for assembling a disk drive, enables the modification of dynamic balance reliably and efficiently. The apparatus adjusts balance in a hard disk drive having disks and a spindle which are assembled in a base. The acceleration to be applied from an actuator is made to act on the top end of the spindle through a holder plate in one accelerator, while the acceleration to be applied from an actuator is made to act on the base end of the spindle through the base in another accelerator.

13 Claims, 8 Drawing Sheets

APPARATUS AND METHOD FOR ADJUSTING BALANCE AND ASSEMBLING DISK DRIVES

BACKGROUND OF THE INVENTION

1. Technical Field

The present invention relates to an apparatus for adjusting balance, a method for adjusting balance, and a method for assembling a disk, which are used to achieve the rotating balance of a disk in a hard disk drive or the like.

2. Description of the Related Art

A disk drive, such as a hard disk drive, has a circular plate-like disk for recording data. The disk is held on a spindle and driven to rotate by a spindle motor. A read/write head accesses an area on the disk surface to read the recorded data and write data onto the disk. In such a disk drive, if the disk is eccentric with respect to the spindle, deflection of rotation is caused when the disk rotates, and as a result, an access error or the like due to the read/write head may occur to reduce the accuracy of reading and writing data. Such eccentricity is caused by displacement of the disk in the radial direction thereof with respect to the center of rotation of the spindle in the range of the clearance formed between the inner peripheral surface of the disk's center hole and the outer periphery of the spindle.

The rotating balance of a disk is classified into two types, static balance and dynamic balance. The static balance is a balance against the vibration component comprising a translational force caused in the disk rotation, and it is influenced by the radial eccentricity of the disk with respect to the center of rotation. The dynamic balance is a balance against the vibration component by the torque (torsional moment) caused when an object rotates, and it is influenced not only by the radial eccentricity of the disk with respect to the center of rotation, but also by displacement of the center of gravity of the disk in the axial direction of the spindle.

If the spindle is provided with only one disk, the thickness of the disk (size in the axial direction of the spindle) is small as compared with the disk diameter, and thus the influence of the dynamic balance is negligibly small as compared with the influence of the static balance. Even if the spindle is provided with a plurality of disks, the influence of the dynamic balance can also be ignored, provided that the setting range of the disks provided on the spindle (setting distance between the disk at one end and the disk at the other end) is short and the spindle is also short. However, as the number of disks provided on the spindle becomes large and the setting range of the disks provided on the spindle becomes large, the effect of the dynamic balance becomes so large that it cannot be ignored. In particular, as the storage capacity demanded in the hard disk drive or the like has recently been larger and larger, the number of disks provided on the spindle tends to increase. Further, since the number of revolutions of the disk also tends to increase to accelerate the access speed, it is needed to accurately adjust dynamic balance as well as static balance.

There has been a technique for adjusting static balance and dynamic balance by attaching a weight to a system comprised of disks and a spindle. For instance, to provide dynamic balance, as shown in FIG. 6, the balance of a spindle 2 provided with a predetermined number of disks 1 is measured, and a weight 3 is attached to both ends of the spindle 2 as needed. However, in this approach, the attaching of the weight 3 is time-consuming, and the balance must be adjusted before the disks 1 and the spindle 2 can be assembled on a base 4. Thus, limitations are imposed on the manufacturing process, and it is not an efficient approach.

The present invention is based on such a technical problem, and its object is to provide an apparatus for adjusting balance, a method for adjusting balance, and a method for assembling a disk, which can adjust dynamic balance reliably and efficiently.

In connection with the foregoing, as a technique for enabling the modification of balance with the disk and the spindle being assembled on the base, the applicant has already proposed the technique disclosed in Japanese Published Unexamined Patent Application No. 9-161394.

In this technique, the spindle is inserted into the center hole of the disk, and after temporarily fixing the disk to the spindle, an acceleration is provided to the spindle in the radial direction of the disk. Then, the disk stands still because of the inertial force by its own weight, and only the spindle skids in the radial direction thereof, by which the eccentricity of the disk is adjusted. And, after the rotating balance of the disk falls within a predetermined accuracy, the disk is permanently fixed to the spindle. By this, static balance can be provided efficiently and reliably.

Further, to adjust dynamic balance with this technique, as shown in FIG. 7, with an arrangement in which a spindle 2 having a predetermined number of disks 1 is set on a base 4, acceleration is given to the base 4 in the radial direction of the disks 1 by actuators 5A and 5B. In this case, the base 4 supports one end (lower end) of the spindle 2 at its bottom 4a. And, to the side wall 4b of the base 4 which is provided so as to surround the outer periphery of the predetermined number of disks 1, acceleration is provided at both the lower and upper ends thereof by the actuators 5A and 5B, thereby to provide acceleration to the two ends of the spindle 2, respectively. Allowing for the overall unbalance of the predetermined number of disks 1 provided on the spindle 2, dynamic balance is adjusted by making the accelerations acting on one end and the other end of the spindle 2 differ from each other.

For instance, to adjust the position of the disks 1 with respect to the center of rotation thereof only on the top end 2a side of the spindle 2, a force is applied to the base 4 only by the actuator 5A. FIG. 8A shows a dynamical model for this. If, in this model, it is assumed that the distance from the center of gravity G of a system comprising the disks 1, spindle 2, and base 4 to the upper end of the spindle 2 is h, and a force F is applied by the actuator 5A at a position at a distance L from a line passing through the center of gravity G and perpendicular to the axis of the spindle 2, then a distributed acceleration a(x) is observed on the axis of the spindle 2. This acceleration a(x) is obtained as follows. The overall translational acceleration $a_G$ is expressed by:

$$a_G = F/M$$

The rotating angular acceleration (around the center of gravity is G) is expressed by the following equation, where M is the overall mass, and I is the rotation moment with respect to the center of gravity G:

$$a - LF/I$$

Thus, the composite acceleration a(x) is expressed by the following equation, whose distribution is as shown in FIG. 8B:

$$a(x) = a_G + ax = F(1/M + Lx/I)$$

As obvious from this figure, if only the upper actuator 5A is operated, a large acceleration is applied to the disk 1 on the upper end side of the spindle 2, and the disk 1 on the upper end side can be selectively skidded. Further, if the distance L is selected so as to fulfill the following expression, it is possible to zero the acceleration provided to the disk 1 on the lower end side of the spindle 2, as shown in FIG. 8C:

$$(1/M-Lx/I)=0$$

However, the careful examination of the above technique by the present inventors shows that the effect as desired cannot be obtained as a matter of fact. The reasons for that are as follows.

1) Since the system comprising the base 4 and the spindle 2 has a very high rigidity, the acceleration provided by the actuator 5A to the upper portion of the spindle 2 is also applied to the lower portion of the spindle 2.

2) If acceleration is provided on a jig 6 only by the upper actuator 5A, it is also applied to the lower end of the side wall 4b of the base 4 by a plate 7 provided between the actuators 5A and 5B and the side wall 4b of the base 4.

3) As shown in FIG. 8D, since the base 4 is set on the jig 6, if acceleration is applied, for instance, by the actuator 5A, a counterforce "−a" of the rotating angular acceleration a caused by it is generated.

For these reasons, the result as desired above cannot be obtained through prior art designs.

SUMMARY OF THE INVENTION

The apparatus for adjusting balance of the present invention, which was based on such examination, is an apparatus for adjusting balance of the rotating system of a disk drive which rotatively drives a disk provided on a spindle, the rotating system including at least the disk, characterized in that there are provided for the spindle a plural pairs of both a displacement detector for detecting the radial displacement component of the rotating system when the rotating system is rotated, and an accelerator for providing the spindle with an acceleration in the direction substantially perpendicular to the axis of the spindle through a retainer member for retaining the spindle or an adapter member detachably fixed to the spindle, and in that each pair of the displacement detector and the accelerator comprises a controller for controlling the acceleration provided by the accelerator according to the detected result in the displacement detector.

With such configuration, if, in each of the plural pairs of the displacement detector and the accelerator which are provided for the spindle, acceleration is applied to the spindle by the accelerator controlled by the controller according to the detected result in the displacement detector, the disk stands still because of the inertia by its own weight, and only the spindle moves. As a result, the positional relation between the disk and the central axis of the spindle changes, so that the balance for the center of rotation of the rotating system including the disk can be adjusted. At this point, to the spindle, acceleration from the accelerator of each pair is provided through the retainer member or the adapter member. With this, acceleration from the accelerator of each pair is directly inputted in a direction substantially perpendicular to the axis of the spindle from the position at which the accelerator of each pair is provided.

If the spindle and the disk integrally rotate, the rotating system are made up of these two, and, if only the disk rotates relative to the spindle, the rotating system consists only of the disk. The present invention is applicable to any case.

Further, the adapter member of this apparatus for adjusting balance can be characterized in that it is detachably fixed to the spindle by a bolt screwed into a tapped hole previously provided in the spindle. If a tapped hole for attaching a cover for the disk and the spindle is previously formed in the spindle, the adapter member can be attached by the use of this tapped hole, and any special process is not needed to attach the adapter member.

Further, the present invention may be an apparatus for adjusting balance comprising a plurality of actuators comprised of a piezoelectric element or the like, each driven upwardly in the vertical direction for applying acceleration to a rotator, which is set with the rotating center shaft thereof being substantially horizontal, at least at one end and the other end of the rotating center shaft, a sensor for detecting the rotating balance when the rotator is rotated, and a controller for controlling the acceleration applied to the rotator by each actuator according to the detected result at the sensor. Also, with such apparatus for adjusting balance, the eccentricity of the rotator with respect to the center of rotation can be eliminated to adjust the rotating balance by applying acceleration to one end and the other end of the rotating center shaft.

However, differently from the present invention, with the configuration in which acceleration is applied horizontally from the side to a rotator with the rotating center shaft thereof being substantially vertical, an abrasion resistance is produced between the floor and the rotating center shaft when acceleration is applied to move the rotating center shaft.

On the other hand, the present invention has a configuration in which acceleration is applied by actuators driven upwardly in the vertical direction to a rotator with the rotating center shaft being substantially horizontal, providing the apparatus for adjusting balance with a so-called vertical configuration. With such configuration, when acceleration is applied to the rotating center shaft by actuators, the rotating center shaft does not receive abrasion resistance between the floor and the rotating center shaft and the applied acceleration directly acts on the rotating center shaft to carry out the modification with good accuracy.

In this case, acceleration is not always applied to both one end and the other end of the rotating center shaft, but it may be applied to either of them depending on the amount of unbalance of the rotator. Further, by the existence of an acceleration transmitter between one end and the other end of the rotating center shaft and each actuator, the acceleration applied by the actuators can be directly transmitted to the rotating center shaft with reliability.

The method for adjusting balance of the present invention is characterized by comprising a step of detecting the displacement of a spindle while disks are rotating, a step of determining the accelerations to be provided to the spindle, a step of providing the respectively determined accelerations to the spindle through a retainer for retaining one end and the other end of the spindle, and a step of determining whether or not the displacement of the spindle after provided with the accelerations is equal to or smaller than a predetermined threshold value. With such a configuration, accelerations can be provided to one end and the other end of the spindle depending on the deflection of the dynamic balance of the disks to adjust it to be equal to or smaller than the predetermined threshold value. To one end and the other end of the spindle, accelerations are directly inputted from the position at which the retainer is provided.

The present invention may be a method for adjusting balance in which, after measuring the amount of unbalance for the center of rotation when a plurality of disks held by a spindle is rotated, either one end or the other end of the spindle or both are struck based on the measured amount of balance, thereby to adjust the amount of unbalance. Thus, by striking either one end or the other end of the spindle or both, the positions of the disk with respect to the center axis of the spindle can be adjusted to reduce the amount of unbalance. Further, by previously pressing one end and the other end of the spindle in the direction opposite to the direction of the strike by a pressing means, respectively, the shock by the strike can be made to positively act on the spindle.

The method for assembling a disk of the present invention can be characterized by having a first step of retaining both ends of a spindle by a retainer while the disk is temporarily fixed to the spindle inserted into the center hole of the disk, a second step of charging the positional relation between the disk and the center axis of the spindle by providing the spindle with acceleration in the direction perpendicular to the axis of the spindle through the retainer, and a third step of permanently fixing the disk to the spindle when the unbalance of the disk for the center axis of the spindle becomes equal to or smaller than a predetermined threshold value. Thus, the adjustment of unbalance of the disk can be efficiently performed in assembling process.

Further, by performing the adjustment of unbalance while the disks and the spindle are set on the base, the manufacturing process can be made more efficient. Furthermore, when providing acceleration to the spindle, the need for providing an additional motor or the like is eliminated by rotating the disk with a drive source provided in the spindle itself.

DETAILED DESCRIPTION OF THE PREFERRED EMBODIMENT

Figure 1:
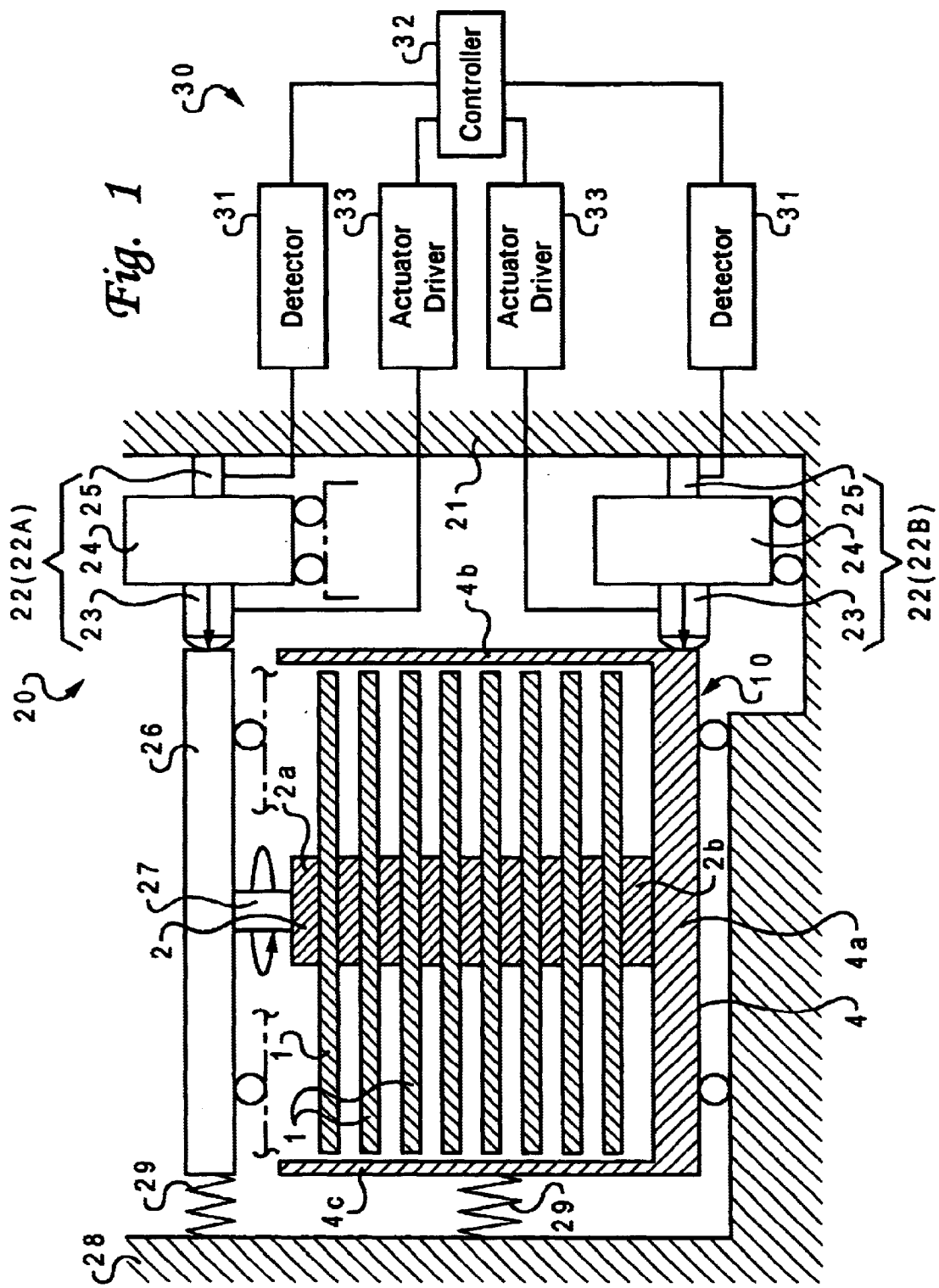
FIG. 1 is a diagram showing a first embodiment of an apparatus for adjusting balance related to the present invention.

Referring now to FIG. 1, a first embodiment of a configuration of the present invention for adjusting balance is shown. Symbol 10 is a hard disk drive (disk drive apparatus), and the hard disk drive 10 is configured so that a predetermined number of disks (rotating system, rotator) 1 are set on a spindle (rotating system, rotator) 2, and the disks 1 and the spindle 2 are housed in a base (retainer member, acceleration transmitter, retainer, holding means) 4 which is upwardly opened. The spindle 2 is integrally provided with a spindle motor (drive source), and in the hard disk drive 10 under such condition, the disks 1 can be driven to rotate around the axis of the spindle 2 by the spindle motor.

Further, symbol 20 is an apparatus for adjusting balance for adjusting the balance of the hard disk drive 10. The apparatus for adjusting balance 20 is configured by providing a reference block 21 with two sets of accelerators (accelerator providing means) 22. The accelerator 22 comprises an actuator 23 for providing acceleration to the hard disk drive 10, a counter mass 24 for receiving the counter-force of the actuator 23, and a force sensor (displacement detecting means, sensor) 25 for detecting the vibration of the hard disk drive 10. As the actuator 23, a piezoelectric element having good responsibility is used.

The two sets of accelerators 22 are disposed so as to be spaced apart by a predetermined distance in the axial direction of the spindle 2. In the actuator 23 of one accelerator (acceleration providing means) 22A, there is provided a holder plate 26 extending in the horizontal direction (direction substantially perpendicular to the axis of the spindle 2) as an adapter member, acceleration transmitter, retainer, or holding means. The holder plate 26 is connected to the top (one end side, one end portion) 2a of the spindle 2 by a connector member (bolt) 27. As the connector member 27, there is a bolt or the like for instance. For the attaching of a top cover or the like (not shown) to block the upper opening of the base 4, a tapped hole (not shown) is previously formed in the top 2a of the spindle 2, and the connector member 27 or the like is screwed into this. The other accelerator (acceleration providing means) 22B is provided so that the actuator 23 abuts on the side portion of the bottom 4a of the base 4.

Thus, the accelerators 22A and 22B are configured so that acceleration can be provided to both ends of the spindle 2 with their actuators 23. On the top 2a side of the spindle 2, acceleration acts from the direction substantially perpendicular to the axis of the spindle 2 through the holder plate 26, and on the base end (the other end side, the other end portion) 2b of the spindle 2, acceleration acts from the direction substantially perpendicular to the axis of the spindle 2 through the bottom 4a of the base 4.

Further, on the side of the hard disk drive 10 supported by the actuators 23 of the two sets of accelerators 22A and 22B, there is provided a counterforce plate 28 integrated with the reference block 21. And, there are provided springs (pressing means) 29 in a compressed state between the counterforce plate 28 and the side wall 4c of the base 4 and the holder plate 26, respectively. With this, the hard disk drive 10 and the holder plate 26 are pressed against the accelerators 22a and 22B, respectively.

For the two sets of accelerators 22A and 22B, a control system 30 is provided to control the driving of the actuators 23. As the control system 30 carries out a control similar to the technique disclosed in Japanese Published Unexamined Patent Application No. 9-161394 mentioned above, the detailed description of it is omitted. The control system 30 comprises detectors 31, a controller (control means) 32, and actuator drivers 33.

When the spindle 2 is driven to rotate by the spindle motor, a force the direction of which changes every time is caused by the overall unbalance (rotating balance, dynamic balance) due to the eccentricities of the rotating center (rotating center axis, axis) of the spindle 2 and each disk 1. In each of the accelerators 22A and 22B, the force sensor 25 detects this force as an amount of unbalance (unbalance), and sends the detected signal to the detector 31. And, the detector 31 outputs a waveform based on the signal detected in the force sensor 25.

The controller 32 determines the magnitude and timing of the acceleration to be applied by the actuator 23 based on the detected result in the detector 31. In the actuator driver 33, by generating a voltage based on the determination, the actuator 23 is driven to produce the acceleration of the determined magnitude with the determined timing. Further, the controller 32 monitors the change in the detected value in the detector 31 after acceleration is actually provided to the spindle 2 by the actuator 23 based on the determined acceleration. And, according to the degree of the change, it determines the acceleration to be provided next time by the actuator 23.

For example, if the force caused in the spindle 2 does not change so much because of unbalance when an acceleration of a certain magnitude is provided to the spindle 2 by the actuator 23, the acceleration to be provided next time is made larger, and conversely, if the change is large, the acceleration to be provided next time is made smaller.

The magnitude of the acceleration provided by the actuator 23 need not be steplessly changed according to the detected value in the detector 31, and the magnitude of the acceleration to be provided by the actuator 23 may be previously set in a plurality of steps to change the steps of the magnitude of the acceleration. Further, it is possible to provide a so-called learning function, in which the data on applied accelerations and resultant changes in balance after starting the balance modification in one hard disk drive 10 is stored, and the stored data is reflected in the determination of the acceleration to be applied later.

Figure 2:
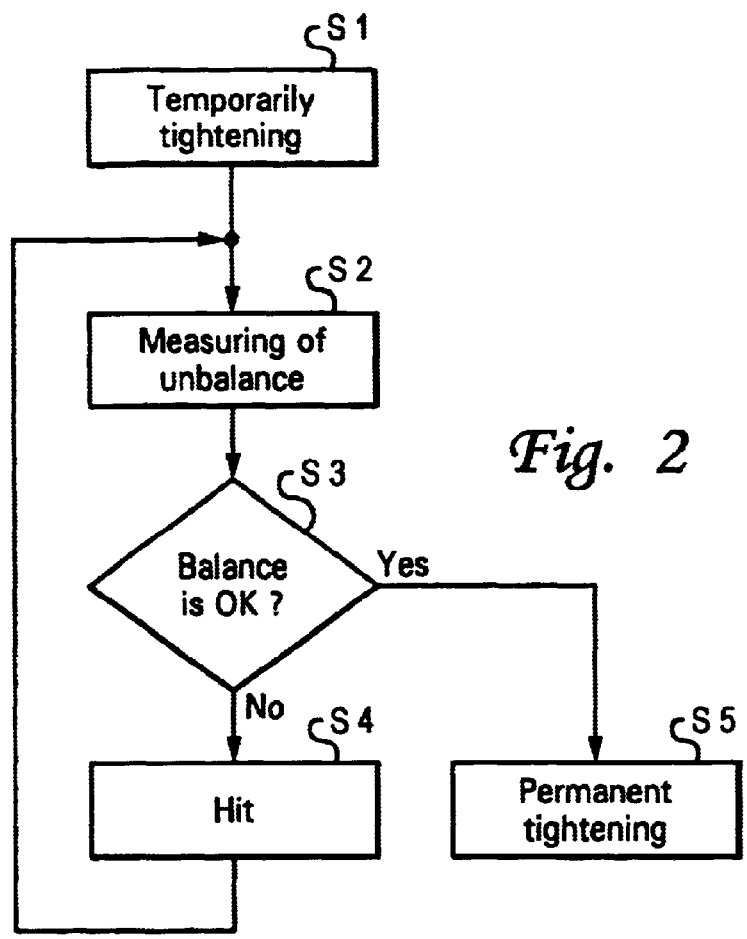
FIG. 2 is a diagram showing the procedure of a method for assembling a disk in this embodiment.

The method for adjusting the balance of the hard disk drive 10 by means of the apparatus for adjusting balance 20 configured as above will be described. FIG. 2 is a flowchart showing the procedure of the balance modification. First, the hard disk drive 10 is set in the apparatus for adjusting balance 20. For this, the side portion of the bottom 4a of the base 4 is made to abut upon the actuator 23 of the accelerator 22B. Further, a connector member 27 such as a bolt is screwed into the tapped hole (not shown) in the top 2a of the spindle 2 to connect the holder plate 26, and the actuator 23 of the accelerator 22A is made to abut upon one end of the holder plate 26.

The hard disk drive 10 is configured so that the spindle 2, on which a plurality of disks 1 are set, is assembled on the base 4. The spindle 2 is inserted into the center hole of each disk 1, and under this condition, the spindle 2 is temporarily fixed (temporarily tightened) to the base 4 (step S1 in FIG. 2). Under this condition, a predetermined clearance is formed between the inner peripheral surface of the center hole of the disk 1 and the outer peripheral surface of the spindle 2, and the disk 1 is movable relative to the center of rotation of the spindle 2 within the range of this clearance.

After setting the hard disk drive 10 in this way, the spindle 2 and the disk 1 are driven to rotate by the spindle motor (not shown). And, when the number of revolutions reaches a predetermined value, change in the force from the spindle 2 caused by the unbalance of the disk 1 is detected in the respective force sensors 25 of the accelerators 22A and 22B (step S2 in FIG. 2). In the force sensor 25 of the accelerator 22A, the change on the top 2a side of the spindle 2 is detected, and in the force sensor 25 of the accelerator 22B, the change on the base end 2b side of the spindle 2 is detected.

Based on the change in the force detected in this way, it is determined whether or not the measured amount of unbalance is within a preset standard value (threshold value) (step S3 in FIG. 2). If the measured amount of unbalance is out of the standard, to adjust it, the accelerations to be applied by the respective actuators 23 of the accelerators 22A and 22B are determined in the control system 30, and based on this, the actuators 23 are driven by the actuator drivers 33. Further, depending on the measured amount of unbalance, acceleration may be provided by only one of the accelerators 22A and 22B.

Then, either one of the top end 2a and the base end 2b of the spindle 2 is struck (hit) by the actuator 23, thereby acceleration is provided (step S4 in FIG. 2). If a force larger than the abrasion force between the disk 1 and the spindle 2 is applied, only the spindle 2 skids with respect to the disk 1 because of the inertial force by the weight of the disk 1, and as a result, the disk 1 moves in relative position with respect to the center of rotation of the spindle 2.

Acceleration is provided to the spindle 2 by the actuator 23 while the spindle 2 is rotated at a predetermined number of revolutions. Accordingly, it is needless to say that the timing for providing acceleration to the spindle 2 should be controlled with high accuracy, and in this respect, a piezoelectric element excellent in responsibility is preferred as the actuator 23.

Subsequently, the change in the force from the spindle 2 after providing acceleration is detected (step S2 in FIG. 2), and it is determined whether or not the detected result is within the predetermined standard (step S3 in FIG. 2). Thereafter, the above steps S4 to S2 to S3 are repeated as necessary, and when the amounts of unbalance (deflection) for both the top end 2a and the base end 2b of the spindle 2 become equal to or smaller than the predetermined standard value, the rotation of the spindle 2 is stopped. Since this completes the modification of balance in the hard disk drive 10, the spindle 2 is finally permanently fixed (permanently tightened) to the base 4 (step S5 in FIG. 2).

Figure 3:
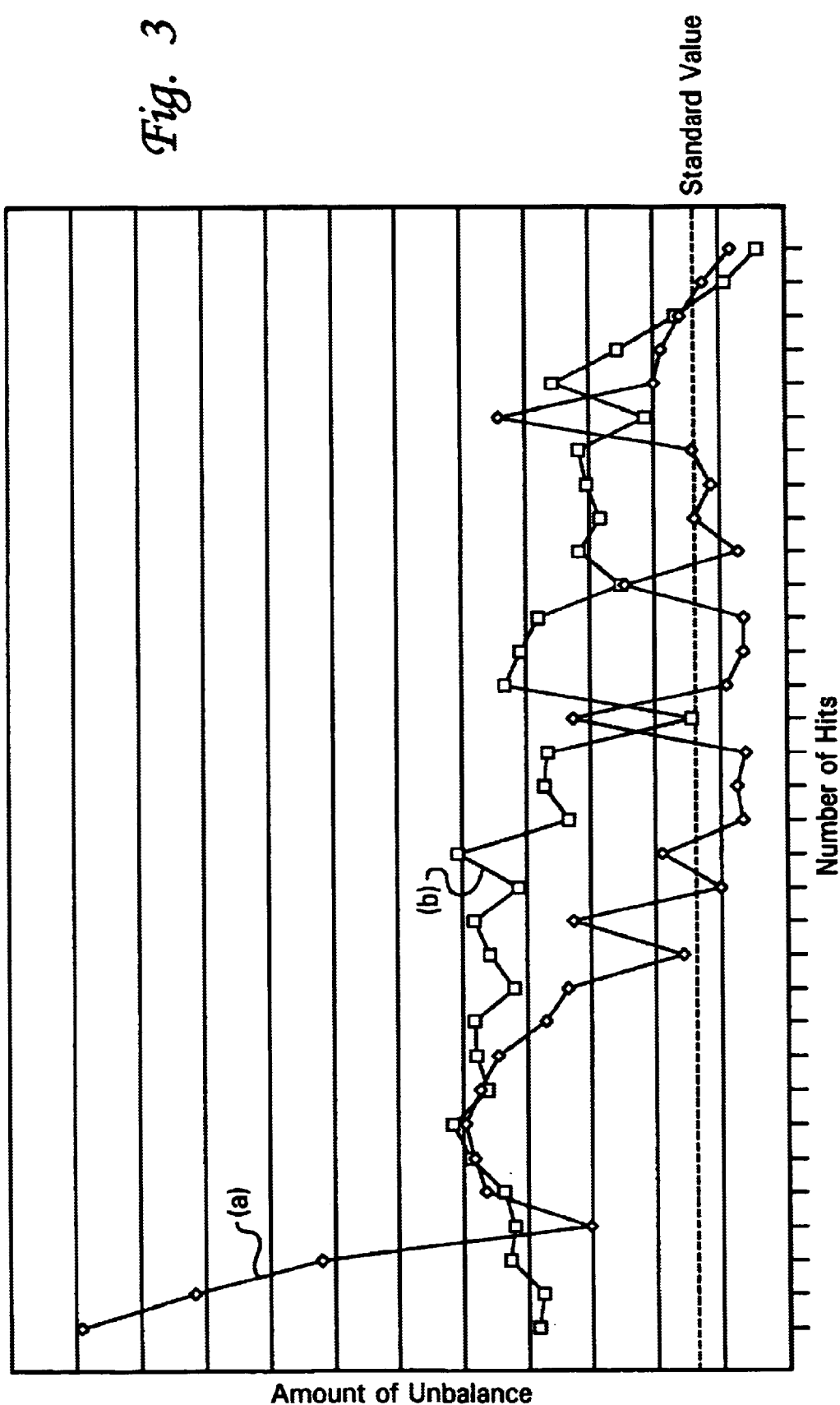
FIG. 3 is a diagram showing change for a disk modification in the above apparatus for adjusting balance.

FIG. 3 shows change in the amounts of unbalance for the top end 2a and the base end 2b of the spindle 2, when the balance modification of the hard disk drive 10 is actually performed in the above-described way. In this figure, the abscissa represents the number of hits (the number of times acceleration is provided by the actuators 23), and the ordinate represents the amounts of unbalance detected by the force sensors 25. And, the line shown by symbol (a) in the figure is the change in the amount of unbalance on the top end 2a side of the spindle 2, and the line shown by symbol (b) is the change in the amount of unbalance on the base end 2b side of the spindle 2.

With the configuration as described above, the dynamic balance of the hard disk drive 10 can be adjusted by the apparatus for adjusting balance 20, with the disk 1 and the spindle 2 being incorporated in the base 4. In particular, the acceleration of accelerator 22A applied from the actuator 23 acts from the direction perpendicular to the axis of the spindle 2 through the holder plate 26. By this, in the respective actuators 23 of the accelerators 22A and 22B, accelerations are directly provided to both ends of the spindle 2.

Figure 4:
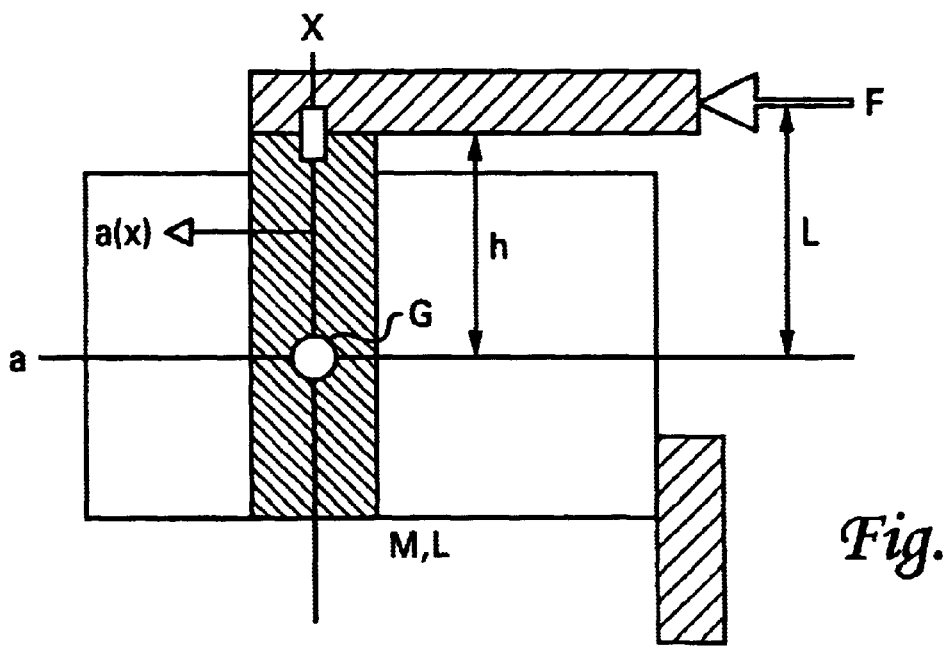
FIG. 4 is a diagram of a dynamical model for a modification by the apparatus for adjusting balance.
Figure 8A:
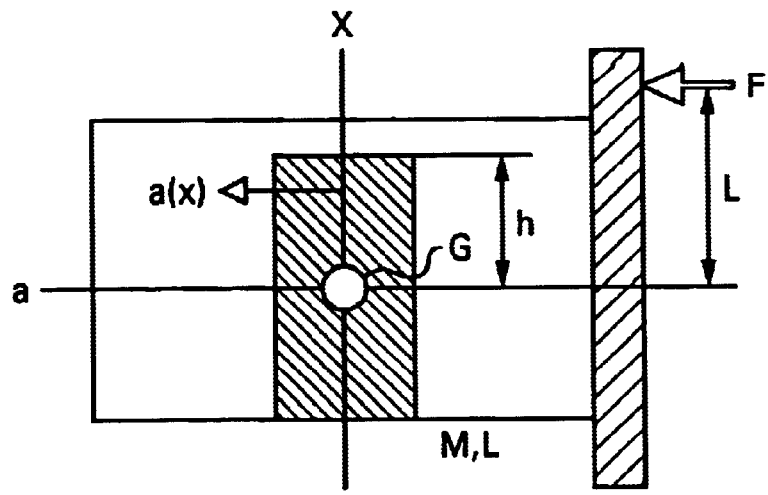
FIG. 8 is a figure for examining the acceleration that acts when the modification of balance is carried out by the apparatus for adjusting balance shown in FIG. 7, in which 8A is a diagram of the assumed dynamical model, 8B and 8C are diagrams showing the acceleration distribution acting on the spindle, and 8D is a diagram of the actual dynamical model.
Figure 8B:
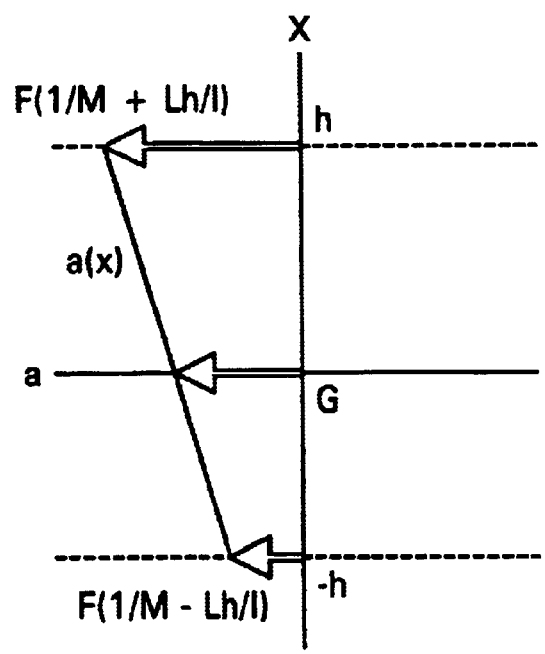
Figure 8C:
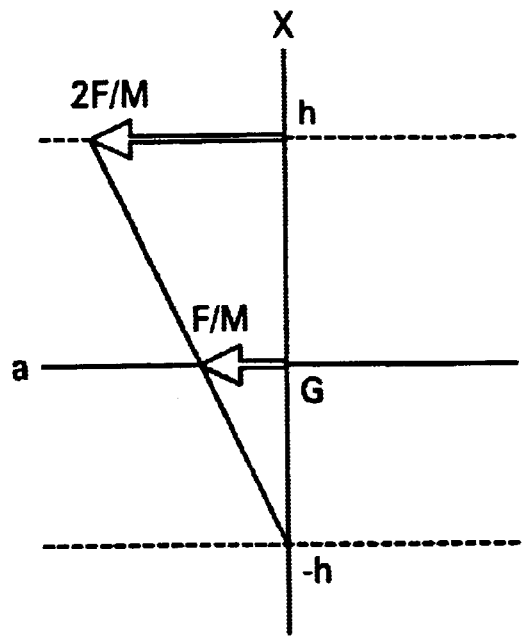
Figure 8D:
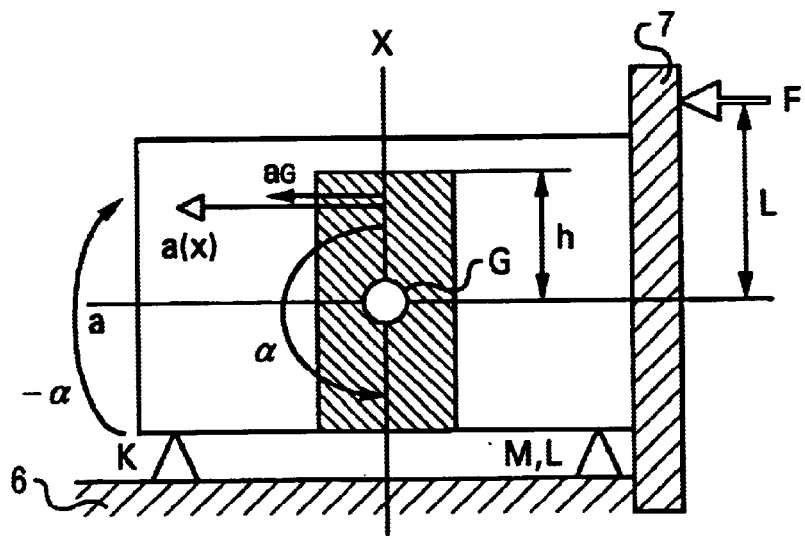

Shown in FIG. 4 is a dynamical model in which acceleration is provided, for instance, only by the actuator 23 of the accelerator 22A. As seen from this model, according to the above apparatus for adjusting balance 20, the theory as shown in FIGS. 8B and 8C, namely, a configuration can be implemented in which the composite acceleration a(x) at a position x on the x-coordinate is:

$a(x) = a_G + \alpha x = F(1/M + Lx/I)$.

As described above, by measuring the amount of unbalance while rotating the spindle 2, and controlling the acceleration to be applied accordingly, the modification of dynamic balance of the hard disk drive 10 can be carried out efficiently and reliably.

In addition, by controlling the magnitude of the acceleration to be applied next time based on change in the amount of unbalance after the acceleration is applied, the balance modification can be performed more efficiently. Thus, according to the apparatus for adjusting balance 20, particularly in a hard disk drive in which the number of disks 1 set on the spindle 2 is large, or the rotational speed (number of revolution) of the disks 1 is high, the modification of dynamic balance can be advantageously carried out.

Figure 5:
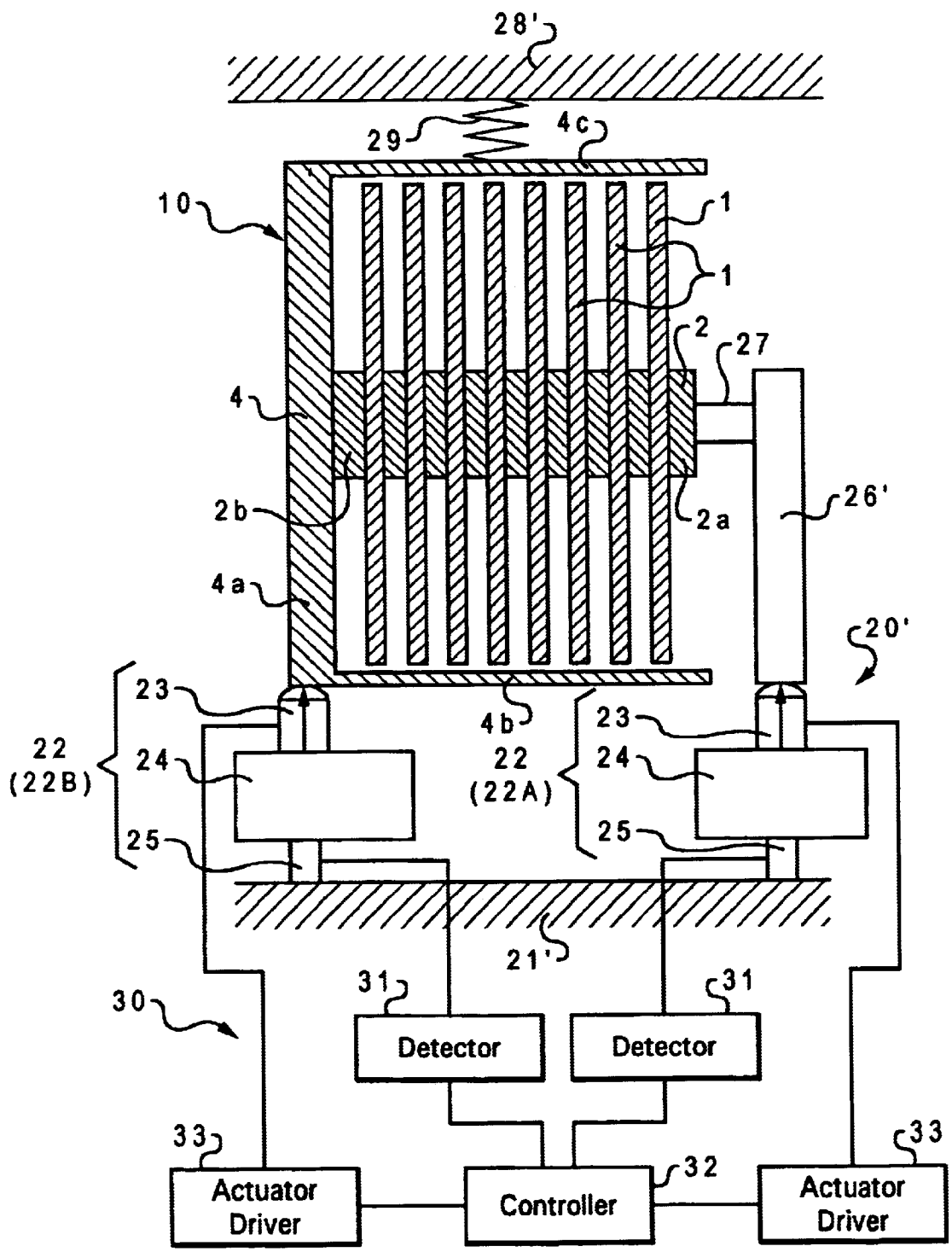
FIG. 5 is a diagram showing a second embodiment in the apparatus for adjusting balance related to the present invention.
Figure 6:
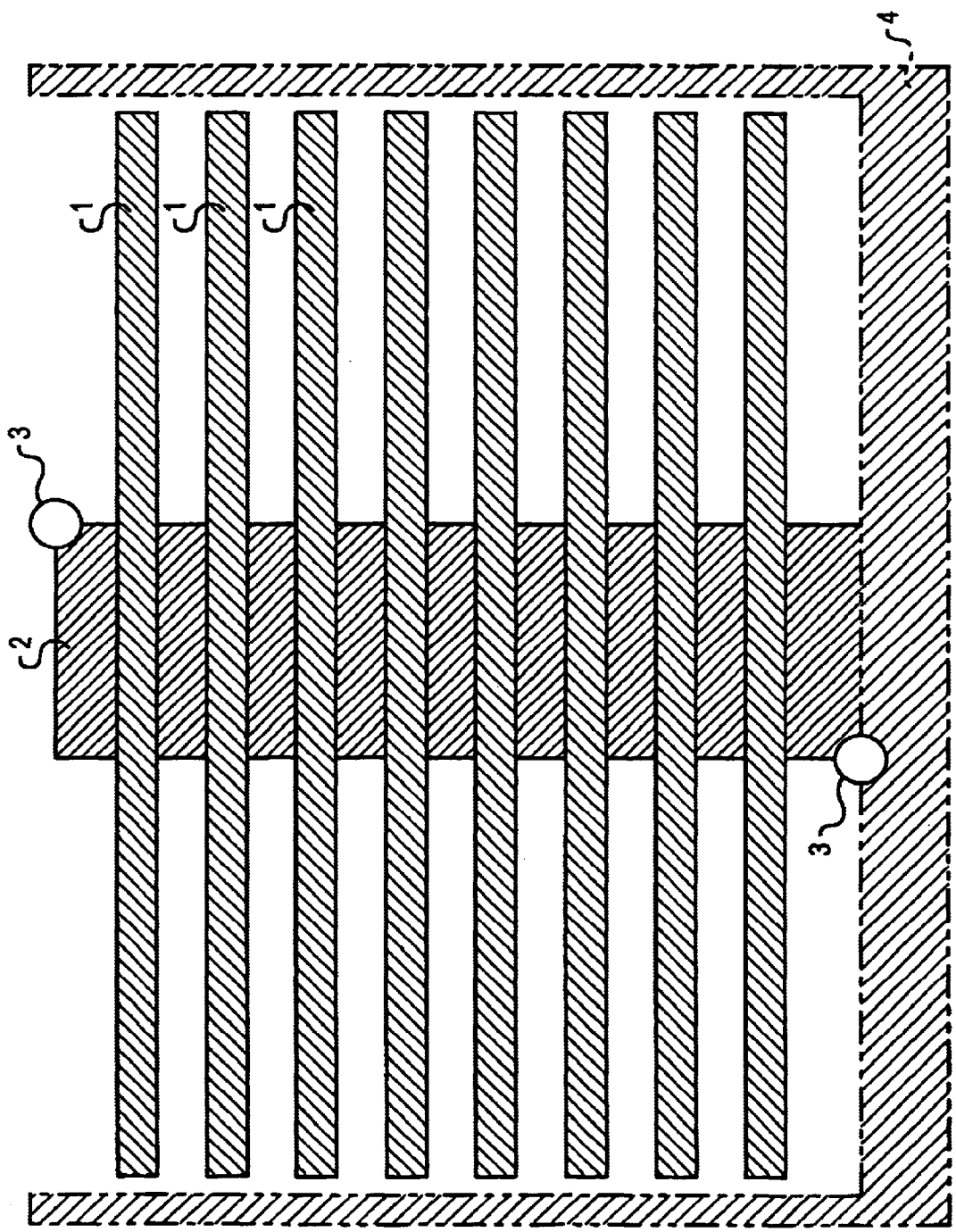
FIG. 6 is a diagram showing an example of a conventional method for adjusting balance.
Figure 7:
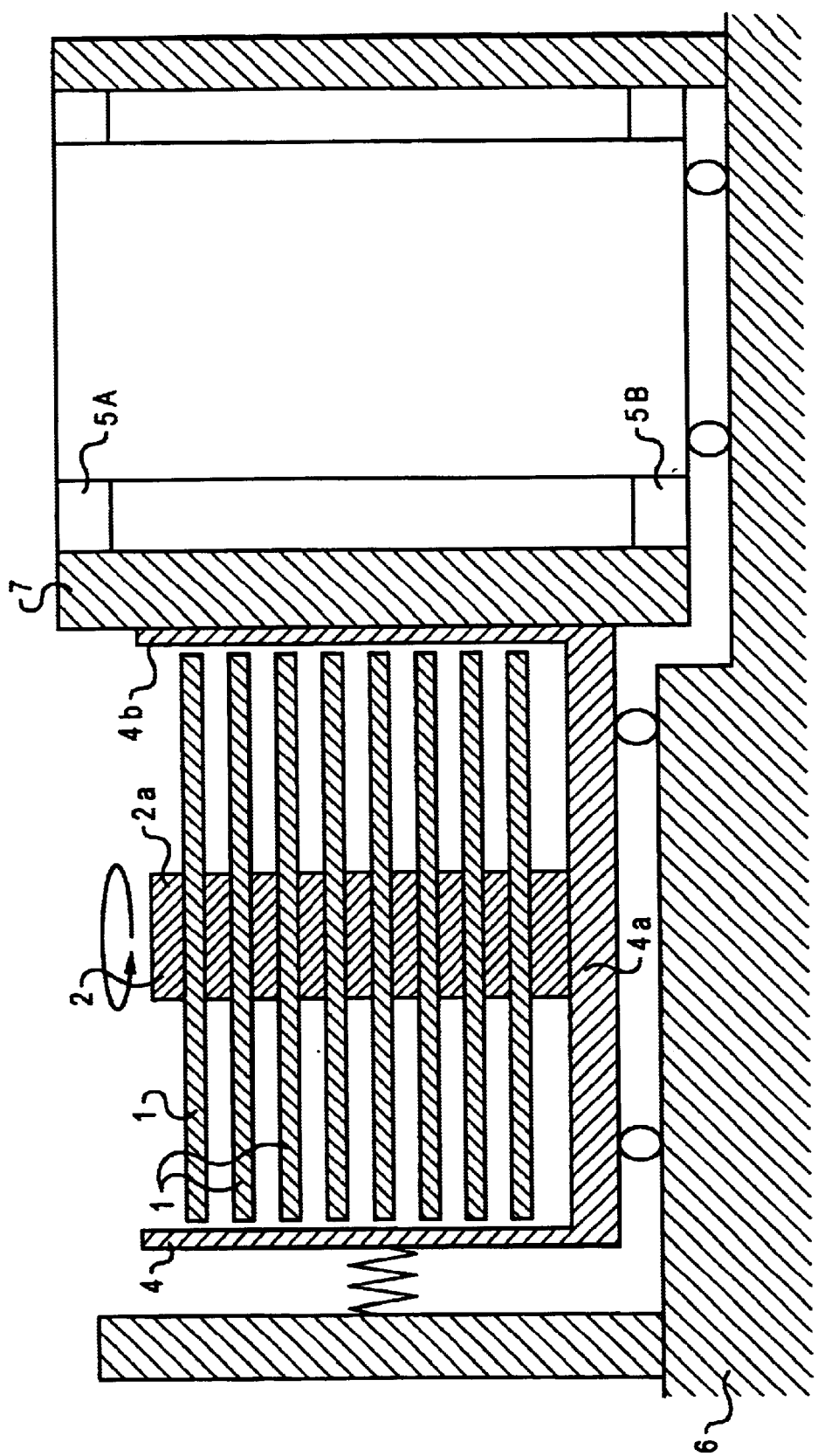
FIG. 7 is a diagram showing another example of the conventional apparatus for adjusting balance, and showing the apparatus for adjusting balance previously proposed by the present inventor.

The second embodiment of the present invention is shown in FIG. 5. An apparatus for adjusting balance 20' in the second embodiment shown below is the vertical type of the apparatus for adjusting balance 20 in the above first embodiment. Only the points different from the apparatus for adjusting balance 20 are described below, and the same symbols are assigned to the configurations common to the first embodiment and the description of them is omitted.

The apparatus for adjusting balance 20' is configured so that accelerators 22A and 22B are provided on a reference block 21', the top surface of which is a substantially horizontal plane, and a hard disk drive 10 is mounted on the accelerators. And, a counterforce plate 28' is provided above the hard disk drive 10, and between the counterforce plate 28' and the hard disk drive 10, there is provided a spring 29 for downwardly pressing the hard disk drive 10. Further, a holder plate (adapter member, acceleration transmitter, retainer, holding means) 26' has one end thereof connected to a spindle 2 with a connector member 27, and has the other end thereof only abutted on an actuator 23, so that it does not experience the pressing force by the spring 29, as in the first embodiment (refer to FIG. 1).

Further, these counterforce plate 28' and the spring 29 are not always be essential configurations, but the counterforce plate 28' and the spring 29 can be omitted if the whole hard disk drive 10 does not move when accelerations are applied by the actuators 23 of the accelerators 22A and 22B, as described later.

The apparatus for adjusting balance 20' configured as above can adjust the dynamic balance of the hard disk drive 10 efficiently and reliably in a manner completely similar to the above first embodiment. Further, in the vertical-type apparatus for adjusting balance 20', the hard disk drive 10 experiences no abrasion resistance and counterforce if the acceleration by the actuator 23 is provided, because it is not in contact with the floor or the like.

Accordingly, it can perform the modification of dynamic balance more efficiently and accurately than the apparatus for adjusting balance 20 (refer to FIG. 1). Furthermore, in the above first and second embodiments, the hard disk drive 10 is configured so that the spindle 2 on which a predetermined number of disks 1 are assembled is incorporated in the base 4, but this is no restriction. For instance, even under the condition that a predetermined number of disks 1 are assembled on the spindle 2 (before incorporated in the base 4), if both ends of the spindle 2 are supported by the holder plates 26 and 26' and the connector member 27, respectively, in a manner similar to the top end 2a side of the spindle 2 as shown in FIGS. 1 and 5 for example, the dynamic balance modification can be carried out as described above. And, after that, the disk 1 and the spindle 2 having experienced the dynamic balance modification are assembled in the base 4.

In addition, the attaching of the spindle 2 to the base 4, the shapes of the holder plates 26 and 26', and the attaching of them to the spindle 2 by the connector member 27 may take any structure. Further, no limitations are imposed on the configuration of the hard disk drive 10, any number of disks 1 can be provided on the spindle 2, and as in the above embodiments, it may be the type in which the disks 1 and the spindle 2 integrally rotate to form a rotating system or rotator, or it may be the type in which the disks 1 are directly driven to rotate by the spindle motor and only the disks 1 rotate as a rotating system or rotator with respect to the spindle 2 of the spindle motor.

Furthermore, the parameter for detecting the displacement of the spindle 2 with the force sensor 25 is not limited to the displacement at the end of the spindle 2, but other ones are allowable. In addition, in the actuator 23, acceleration is provided at both ends of the spindle 2, but this is no restriction, and any other position may be accepted. Further, the actuator 23 and the force sensor 25 are coaxially disposed, but this is no restriction, and it is possible that the actuator 23 and the force sensor 25 are separately provided, and the providing of acceleration and the detection of displacement are performed at different positions on the spindle 2. And, the actuator itself 23 is not limited to piezoelectric element, but other materials may be used without causing any problem if they have a desired function and responsibility.

Further, in the above embodiments, the actuator 23 is always in contact with the base 4 and the holder plates 26 and 26', but this is no restriction, and, for instance, it is also possible that the actuator 23 is spaced from the base 4 and the holder plates 26 and 26' by a predetermined distance, and the base 4 and the holder plates 26 and 26' are hit by the top end of the actuator 23 to provide acceleration when the actuator 23 is operated. This also produces acceleration at the spindle 2 from the moment in time at which it is hit by the actuator 23, providing an effect similar to the above described one.

Moreover, in the above embodiments, the magnitude of the acceleration provided by the actuator 23 is varied depending on the detected displacement of the spindle 2, but it is not always needed to be varied, and an acceleration of a fixed magnitude may always be provided. Further, particularly for the vertical-type apparatus for adjusting balance 20', if the weight of the system comprising the disks 1, spindle 2, and base 4 is large enough to provide a sufficient acceleration, the counterforce plate 28 and 28' and the spring 29 can be omitted.

Furthermore, in the above embodiments, a standard value (refer to FIG. 3) is preset for balance modification, but this standard value, or the allowable amount of unbalance is appropriately set according to the number of the disks 1, the number of revolutions used, the required data read rate, soft error rate, or the like. In addition, in the above embodiments, the modification of dynamic balance for the hard disk drive 10 has been taken by way of example, disks other than hard disk may be employed.

Further, although, in the above embodiments, only the modification of dynamic balance has been described, it is to be understood that the modification has been completed also for static balance at a point of time at which the modification of dynamic balance has been performed. As described above, in accordance with the present invention, by directly applying accelerations to one and the other end of a spindle independently, the modification of dynamic balance of disks can be carried out efficiently and reliably.

What is claimed is:

1. An apparatus for adjusting the balance of a disk drive, comprising:

a rotating system including a disk and a spindle, the spindle having a displacement detector for detecting a radial displacement component of the rotating system when the rotating system is rotated, and an accelerator for providing the spindle with an acceleration in a direction substantially perpendicular to an axis of the spindle through a retainer member for retaining the spindle; wherein the displacement detector and the accelerator have a controller for controlling the acceleration provided by the accelerator according to a detected result in the displacement detector.

2. The apparatus of claim 1, further comprising an adapter member detachably joined to the spindle with a fastener, and wherein the acceleration is applied through the adapter member.

3. An apparatus for adjusting the rotational balance of a rotator, comprising:

a plurality of actuators each driven upwardly in a vertical direction for applying acceleration to a rotator, which is set with a rotating center shaft thereof being substantially horizontal, at least at the ends of the rotating center shaft;

a sensor for detecting rotational balance when the rotator is rotated; and a controller for controlling acceleration applied to the rotator by the actuators according to a detected result in the sensor.

4. The apparatus of claim 3, wherein the actuators are formed from a piezoelectric element.

5. The apparatus of claim 3 wherein the controller repeatedly drives the actuators until the detected result in the sensor becomes equal to or smaller tan a predetermined threshold value, while controlling the acceleration applied by the actuators according to the detected result in the sensor.

6. The apparatus of claim 3 wherein an acceleration transmitter for directly transmitting the acceleration applied at the actuators to the rotating center shaft exists between the ends of the rotating center shaft and the actuators.

7. A method of adjusting the dynamic balance for a rotating center of a spindle on which a plurality of disks are set, comprising the steps of:

detecting a displacement of the spindle in a direction perpendicular to an axis of the spindle while the disks are rotating;

determining accelerations to be respectively provided to ends of the spindle based on the spindle displacement when the spindle displacement is greater than or equal to a predetermined threshold value;

providing the determined accelerations to the spindle through a retainer for retaining the ends of the spindle; and determining whether the displacement of the spindle after provided with the accelerations is less than or equal to the predetermined threshold value.

8. The method of claim 7, wherein, in the step of providing accelerations to the spindle, the accelerations are provided while the disks are rotating.

9. A method of adjusting balance, comprising the steps of:

measuring an amount of imbalance for a rotating center when a plurality of disks held on a spindle are rotated; and then adjusting the amount of imbalance by striking at least one end of the spindle based on the measured amount of imbalance.

10. The method of claim 9 wherein the adjusting step comprises pressing the ends of the spindle with a pressing device in a direction opposite to the striking direction.

11. A method of assembling a disk in a disk drive, comprising:

retaining ends of a spindle with a retainer while the disk is temporarily joined to the spindle inserted into a center hole of the disk;

changing a positional relation between the disk and an axis of the spindle by providing the spindle with acceleration in the direction perpendicular to the axis of the spindle through the retainer; and permanently joining the disk to the spindle when an imbalance of the disk with respect to the axis of the spindle becomes less than or equal to a predetermined threshold value.

12. The method of claim 11 wherein the retaining step comprises inserting one end of the spindle into the disk on abase that acts as the retainer for accommodating the disk and the spindle.

13. The method of claim 11 wherein the changing step comprises rotating the disk by a drive source provided in the spindle.

* * * * *

UNITED STATES PATENT AND TRADEMARK OFFICE
CERTIFICATE OF CORRECTION

PATENT NO.    : 6,693,757 B2
DATED         : February 17, 2004
INVENTOR(S)   : Hayakawa et al.

It is certified that error appears in the above-identified patent and that said Letters Patent is hereby corrected as shown below:

Column 11,
Line 36, please remove the word "tan" and insert the word -- than -- betweeen the words "smaller" and "a".

Column 12,
Line 42, please remove the word "abase" and insert the words -- a base -- between the words "on" and "that".

Signed and Sealed this

Fifteenth Day of June, 2004

JON W. DUDAS
*Acting Director of the United States Patent and Trademark Office*